Dec. 4, 1951            O. T. EAMES            2,577,114
PALLET FOR CAKE OR BAR SOAP
Filed Jan. 13, 1949
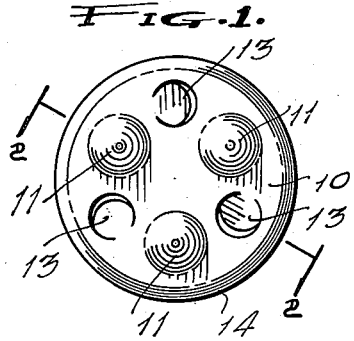
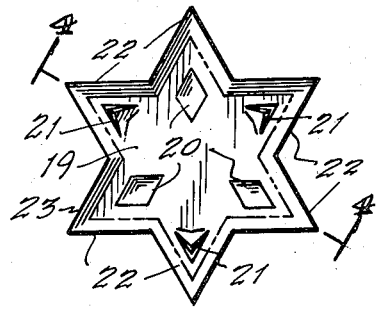
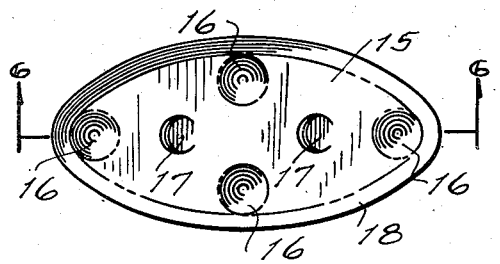
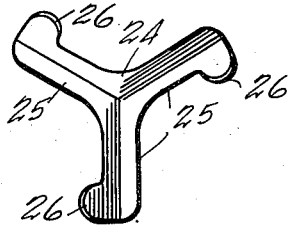
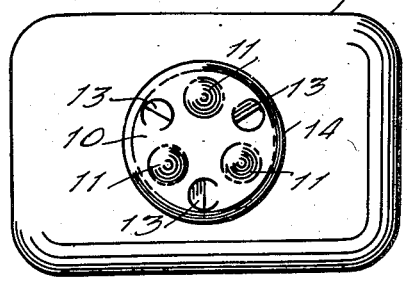
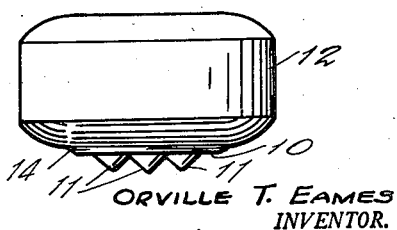
ORVILLE T. EAMES
INVENTOR.
BY
ATTORNEY

Patented Dec. 4, 1951

2,577,114

UNITED STATES PATENT OFFICE 2,577,114

PALLET FOR CAKE OR BAR SOAP

Orville T. Eames, Fort Worth, Tex.

Application January 13, 1949, Serial No. 70,619

1 Claim. (Cl. 45—28)

This invention relates to devices for conserving bar or cake soap, and it has particular reference to a pallet for attachment to a soap cake and having bosses thereon capable of spacing the cake from its supporting surface, and its principal object resides in the provision of a plate of any suitable shape having barbs formed therewith adapted to be pressed into the soap cake to secure the plate thereto and thus provide a means for spacing the cake from a supporting surface which may be moist causing the soap to melt or disintegrate.

Another object of the invention is that of providing a simple and inexpensive device which is pleasing in appearance and minimized in dimensions to cover as little of the area of the cake as would be consistent with the proper support thereof in a soap dish, or other type of container, and elevate the cake above the bottom of the container to provide an air space thereunder whereby to conserve the soap.

Broadly, the invention contemplates the provision of a device through which much saving in soap can be accomplished and with little effort, affording a pallet which is capable of being removed from well dissipated bars and applied to fresh bars as needed.

While the foregoing objects are paramount, other and lesser objects will become manifest as the description proceeds, taken in connection with the appended drawings, wherein:

Figure 1 is an inverted plan view of the preferred form of the invention, showing the spaced bosses and integral barbs.

Figure 2 is a transverse sectional view, taken on lines 2—2 of Figure 1, showing the form of the bosses and the barbs.

Figure 3 is another form of the invention shown in plan.

Figure 4 is a transverse sectional view taken on lines 4—4 of Figure 3.

Figure 5 illustrates, in plan, a modification of the device shown in Figure 1.

Figure 6 is a longitudinal cross-sectional view of the invention, taken on lines 6—6 of Figure 5.

Figure 7 illustrates another form of the invention.

Figure 8 is an elevational view of the form of the invention shown in Figure 7.

Figure 9 is an inverted plan view of the preferred form of the invention attached to a cake of soap, and Figure 10 is an end elevational view of a cake of soap showing the invention attached.

The invention comprises a plate 10 which is circular, in its preferred form, as shown in Figure 1, and has a plurality of bosses 11 formed therein which function to space a soap cake 12 from its supporting surface, as in a soap dish, or other container, in a manner illustrated in Figure 10. Means for attaching the plate 10 to the soap cake 12 comprise a plurality of barbs 13 which are formed in the plate 10 and extend at an angle therefrom, as shown in Figure 2.

The barbs 13 can be pressed into the soap by partially rotating the plate 10 clockwise as pressure is applied thereto. The periphery 14 of the plate 10 is depressed or bevelled and is capable of being pressed into the soap so that, in use, cementing action of the soap will occur to more firmly secure the pallet to the cake 12.

In Figures 5 and 6 the pallet 15 is substantially oval in shape but is formed with bosses 16 and barbs 17 similar to the corresponding members of the device shown in Figures 1 and 2. The pallet 15 is applied to a soap cake 12 by pressing the same against the cake downwardly and forwardly, the barbs 17 extending in the same direction. The periphery 18 is also bevelled to engage the cake 12.

The pallet 19, shown in Figure 3, is star-shaped and has bosses 20 and barbs 21 formed in alternate points 22 of the pallet 19. The perimeter 23 is bevelled or depressed to function in the same manner as the corresponding elements of the previously described forms of the invention. The pallet 19 is applied to the cake 12 by simply pressing the same thereon, the barbs 21 extended outwardly.

A substantially Y-shaped pallet 24 is shown in Figures 7 and 8, each of the legs 25 thereof being V-shaped in transverse section, as shown particularly in Figure 8, and have barbs 26 formed on their outer ends which can be pressed into the cake 12. This arrangement can be applied to the cake by pressing the same against the cake 12 and partially rotating the same to direct the barbs 26 into the soap.

Manifestly, the invention may be produced in any of several forms while embodying substantially identical features by which the same can be applied to a soap cake and space the said cake from its supporting surface, and it is therefore not intended that the invention be limited to any particular perimetrical shape.

What is claimed is:

In a pallet for bar or cake soap comprising a protective plate, a plurality of circular cut-out members formed in said plate and projecting from the upper surface thereof at obtuse angles and in the same direction the said cut-out members being capable of insertion in one face of a bar of soap, and a plurality of conical embossments formed in said plate opposite said cut-out members providing means for supporting said soap and spacing the same from a supporting surface.

ORVILLE T. EAMES.

REFERENCES CITED

The following references are of record in the file of this patent:

FOREIGN PATENTS

| Number | Country | Date |
|---|---|---|
| 368,083 | France | Sept. 25, 1906 |
| 513,217 | Great Britain | Oct. 6, 1939 |
| 712,504 | France | July 21, 1931 |
| 876,765 | France | Aug. 17, 1942 |